US007281664B1

(12) United States Patent  
Thaeler et al.

(10) Patent No.: US 7,281,664 B1  
(45) Date of Patent: Oct. 16, 2007

(54) METHOD AND SYSTEM FOR HIERARCHICAL MANAGEMENT OF A PLURALITY OF REGIONS OF AN ENCODED SURFACE USED BY A PEN COMPUTER

(75) Inventors: Charles Thaeler, Novato, CA (US); Peter Van Horn, San Jose, CA (US)

(73) Assignee: LeapFrog Enterprises, Inc., Emeryville, CA (US)

( * ) Notice: Subject to any disclaimer, the term of this patent is extended or adjusted under 35 U.S.C. 154(b) by 0 days.

(21) Appl. No.: 11/244,653

(22) Filed: Oct. 5, 2005

(51) Int. Cl.  
*G06K 7/10* (2006.01)

(52) U.S. Cl. .................. 235/462.49; 235/462.46; 235/472.03

(58) Field of Classification Search .......... 235/462.49, 235/462.45, 462.46, 435, 487, 486, 472.03  
See application file for complete search history.

(56) References Cited

U.S. PATENT DOCUMENTS

| | | | |
|---|---|---|---|
| 4,464,118 A | | 8/1984 | Scott et al. |
| 4,793,810 A | | 12/1988 | Beasley, Jr. |
| 5,059,126 A | | 10/1991 | Kimball |
| 5,260,697 A | * | 11/1993 | Barrett et al. ............... 345/173 |
| 5,485,176 A | | 1/1996 | Ohara et al. |
| 5,596,698 A | | 1/1997 | Morgan |
| 5,730,602 A | | 3/1998 | Gierhart et al. |
| 5,855,483 A | | 1/1999 | Collins et al. |
| 6,081,261 A | | 6/2000 | Wolff et al. ................. 345/179 |
| 6,295,439 B1 | | 9/2001 | Bejar et al. |
| 6,502,756 B1 | | 1/2003 | Fahraeus |
| 6,532,314 B1 | | 3/2003 | Plain et al. |
| 6,577,299 B1 | | 6/2003 | Schiller et al. |
| 6,608,618 B2 | | 8/2003 | Wood et al. |
| 6,732,927 B2 | * | 5/2004 | Olsson et al. ............... 235/454 |
| 6,816,702 B2 | | 11/2004 | Kuntz et al. |
| 6,853,293 B2 | | 2/2005 | Swartz et al. |
| 6,966,495 B2 | | 11/2005 | Lynggaard et al. |

(Continued)

FOREIGN PATENT DOCUMENTS

EP        0519714        12/1992

(Continued)

OTHER PUBLICATIONS

Kramer, "Translucent Patches-Dissolving Windows", Nov. 2, 1994 Symposium on user interface software and technology. pp. 121-130.

(Continued)

*Primary Examiner*—Thien M. Le  
*Assistant Examiner*—Edwyn Labaze

(57) ABSTRACT

A method for hierarchical management of a plurality of regions of an encoded surface. The method includes recognizing unique encoded information on a portion of the surface in response to a pen computer touching down on the portion. A unique location of the portion of the surface is determined based on the unique encoded information. A region is determined out of the plurality of regions for the location. Upon the determination of the region, a determination is made as to whether the location is within a sub-region within the region. If the location is within a sub-region, a function of the pen computer is performed based on the sub-region. If the location is not within a sub-region, a function of the pen computer is performed based on the region.

31 Claims, 17 Drawing Sheets

U.S. PATENT DOCUMENTS

| | | |
|---|---|---|
| 2002/0041290 A1 | 4/2002 | LeKuch et al. |
| 2002/0197589 A1 | 12/2002 | Wood et al. |
| 2003/0014615 A1 | 1/2003 | Lynggaard ............ 712/220 |
| 2003/0020629 A1 | 1/2003 | Schwartz et al. ...... 340/825.25 |
| 2003/0071850 A1 | 4/2003 | Geidi ............ 345/781 |
| 2003/0087219 A1 | 5/2003 | Berger et al. |
| 2003/0162162 A1 | 8/2003 | Marggraff et al. |
| 2003/0218604 A1 | 11/2003 | Wood et al. |
| 2004/0091842 A1 | 5/2004 | Carro |
| 2004/0121298 A1 | 6/2004 | Creamer et al. |
| 2004/0140966 A1 | 7/2004 | Marggraff et al. ....... 345/179 |
| 2004/0229195 A1 | 11/2004 | Marggraff et al. |
| 2005/0024346 A1* | 2/2005 | Dupraz et al. ........... 345/179 |
| 2006/0033725 A1 | 2/2006 | Marggraff et al. |

FOREIGN PATENT DOCUMENTS

| | | |
|---|---|---|
| JP | 10-111639 | 4/1998 |
| JP | 11119790 | 4/1999 |
| JP | 2000-293303 | 10/2000 |
| WO | WO 00/73983 A1 | 12/2000 |
| WO | WO 01/01670 A1 | 1/2001 |
| WO | WO 01/16691 A1 | 3/2001 |
| WO | WO 01/26032 A1 | 4/2001 |
| WO | 2001/048685 | 7/2001 |
| WO | 2001067222 | 9/2001 |
| WO | WO 01/71473 A1 | 9/2001 |
| WO | WO 01/71475 A1 | 9/2001 |
| WO | WO 01/75723 A1 | 10/2001 |
| WO | WO 01/75773 A1 | 10/2001 |
| WO | WO 01/75780 A1 | 10/2001 |
| WO | WO 01/95559 A1 | 12/2001 |
| WO | 2004084190 | 9/2004 |

OTHER PUBLICATIONS

Robertson G.G. et al., "Buttons as First Class Objects on an X Desktop", Nov. 11, 1991, UIST '91. 4$^{th}$ Annual Symposium on user interface software and technology. Proceedings of the ACM Symposium on user interface software and technology. Hilton Head, SC, Nov. 11-13, 1991, ACM symposium on user interface software and technology, New York, pp. 35-44.

* cited by examiner

| REGION ID 910 | PAPER SIZE 920 | SPATIAL DEFINITION 930 | USER ICONS 999 | PAGE # 990 | APPLICATION 995 | AUTHORIZATION 998 |
|---|---|---|---|---|---|---|
| 802 | 3X5 | $x_1 y_1 \rightarrow x_2 y_2$ | "HOMEWORK" | 1 | DOODLES | ALL |
| 680 | 8.5X11 | $x_3 y_3, x_1 y_4$ | | 1 | A | ALL |
| 691 | 8.5X11 | $x_5 y_5, x_6 y_6$ | | 1 | ANY | COMP. A |

T
1401 agua
1402

C
1405

| | 8 | | |
|---|---|---|---|
| 7 | | 9 | + |
| | | | - |
| 4 | 5 | 6 | / |
| | | | X |
| 1 | 2 | 3 | |
| | | | = |

METHOD AND SYSTEM FOR HIERARCHICAL MANAGEMENT OF A PLURALITY OF REGIONS OF AN ENCODED SURFACE USED BY A PEN COMPUTER

CROSS REFERENCES TO RELATED APPLICATIONS

This application is related to the co-pending, commonly-owned U.S. patent application Ser. No. 10/803,806, filed Mar. 17, 2004, by James Marggraff et al., entitled "Scanning Apparatus," and hereby incorporated by reference in its entirety.

This application is related to the co-pending, commonly-owned U.S. patent application Ser. No. 10/861,243, filed Jun. 3, 2004, by James Marggraff et al., entitled "User Created Interactive Interface," and hereby incorporated by reference in its entirety.

This application is related to the co-pending, commonly-owned U.S. patent application Ser. No. 11/034,657, filed Jan. 12, 2005, by James Marggraff et al., entitled "Methods And Devices For Retrieving And Using Information Stored As A Pattern On A Surface," and hereby incorporated by reference in its entirety.

This application is related to the co-pending, commonly-owned U.S. patent application Ser. No. 11/244,652, filed Oct. 05, 2005, by Tracy L. Edgecomb et al., entitled "A Method And System For Accessing Region Parameter Information Associated With Encoded Information On A Surface," and hereby incorporated by reference in its entirety.

TECHNICAL FIELD

Embodiments of the invention relate to the control and use of interactive devices, computers, electronic devices, appliances, toys, and the like.

BACKGROUND ART

Devices such as optical readers or optical pens conventionally emit light that reflects off a surface to a detector or imager. As the device is moved relative to the surface (or vice versa), successive images are rapidly captured. By analyzing the images, movement of the optical device relative to the surface can be tracked.

One type of optical pen is used with a sheet of paper on which very small dots are printed. The dots are printed on the page in a pattern with a nominal spacing of about 0.3 millimeters (0.01 inches). The pattern of dots within any region on the page is unique to that region. The optical pen essentially takes a snapshot of the surface, perhaps 100 times a second or more. By interpreting the dot positions captured in each snapshot, the optical pen can precisely determine its position relative to the page.

Applications that utilize information about the position of an optical pen relative to a surface have been or are being devised. An optical pen with Bluetooth or other wireless capability can be linked to other devices and used for sending electronic mail (e-mail) or faxes.

The increasing power of embedded computer systems and the complexity of the functions they are able to implement have created a need for a more intuitive and user-friendly manner of using such systems. A typical prior art optical pen will implement its intended functionality by the user operating one or more buttons/switches or controls of the optical pen to activate one or more software programs, routines, embedded devices, or the like. The pen may contain or be in communication with a computer system. Upon actuation of such controls, the pen device performs its intended function. Accessing the capabilities of increasingly powerful optical pens through the limited number and configuration of switches, buttons, etc., provided on the pen itself, or any remotely coupled computer system device, is not a satisfactory arrangement.

One prior art solution uses the optical pen to recognize a user-defined command, and uses that command to invoke some function of the pen (e.g., PCT publication WO/01/48590 A1). For example, a user's writing can be recognized (e.g., in real-time) and interpreted as a command for the optical pen. The drawback with this solution involves the fact that interaction and control of the functions of the pen requires real-time recognition of the user's handwriting (e.g., as the user writes the command down on a sheet of paper). This solution is not always satisfactory due to the fact that interaction with more complex functionality of an optical pen requires the user to repeatedly write-down one or more commands to access different choices, options, or functions provided by the pen. While the solution might be satisfactory for exceedingly simple, single step type applications (e.g., "turn off", "store", etc.), the solution is overly cumbersome and limiting in those cases where more complex, satisfying, rich functionality is desired.

DISCLOSURE OF THE INVENTION

Accordingly, a user interface method and system that enables interaction with more complex functionality of an optical pen device having a computer system associated therewith and enables more efficient access to the different choices, options, and functions provided by the pen device, would be valuable. What is further desired is a method and interactive interface useful for interacting with an operating system resident on, or in communication with, a pen device. Embodiments in accordance with the present invention provide these and other advantages.

A method for hierarchical management of a plurality of regions of an encoded surface. The method includes recognizing unique encoded information on a portion of the surface in response to a pen computer touching down on the portion. A unique location of the portion of the surface is determined based on the unique encoded information. A region is determined out of the plurality of regions for the location. Upon the determination of the region, a determination is made as to whether the location is within a sub-region within the region. If the location is within a sub-region, a function of the pen computer is performed based on the sub-region. If the location is not within a sub-region, a function of the pen computer is performed based on the region. The encoded surface can be a sheet of paper.

These and other objects and advantages of the present invention will be recognized by one skilled in the art after having read the following detailed description, which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 7 is an illustration of an exemplary data set of encoded regions and associated information in accordance with one embodiment of the present invention.

FIG. 14 shows a two-dimensional diagram depicting the regions for a translator application and the regions for a calculator application in accordance with one embodiment of the present invention.

DETAILED DESCRIPTION OF THE EMBODIMENTS

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Notation and Nomenclature

Some portions of the detailed descriptions, which follow, are presented in terms of procedures, steps, logic blocks, processing, and other symbolic representations of operations on data bits within a computer memory. These descriptions and representations are the means used by those skilled in the data processing arts to convey most effectively the substance of their work to others skilled in the art. A procedure, computer executed step, logic block, process, etc., are here, and generally, conceived to be self-consistent sequences of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing," "computing," "associating," "generating," or the like, refer to the action and processes of a microcontroller, computer system, or similar electronic computing device, that manipulates and transforms data represented as physical (electronic) quantities within registers and memories into other data similarly represented as physical quantities.

Embodiments of the Invention

Figure 1:
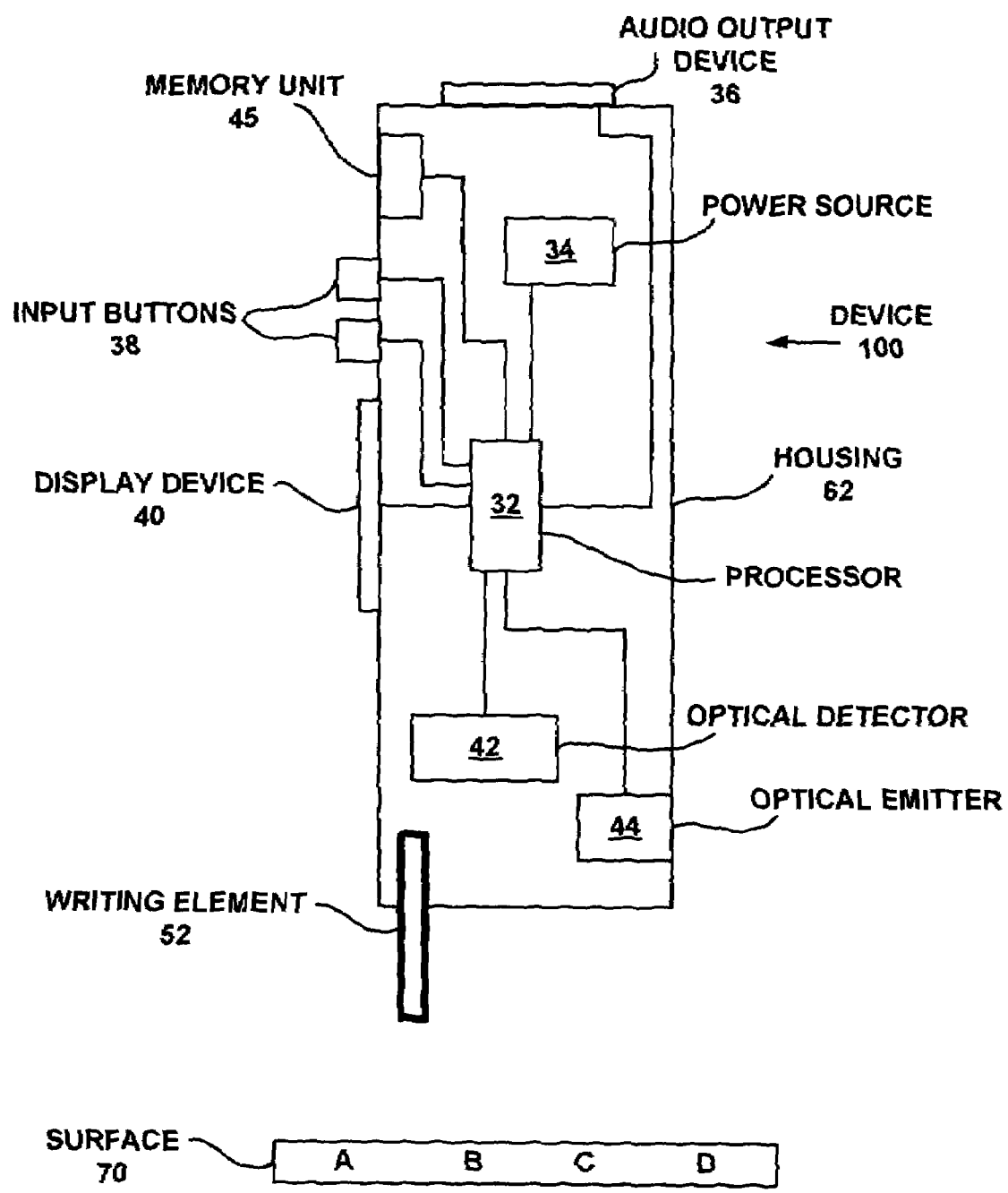
FIG. 1 is a block diagram of a device upon which embodiments of the present invention can be implemented.

FIG. 1 is a block diagram of a pen device 100 upon which embodiments of the present invention can be implemented. In general, pen device 100 may be referred to as an optical device, more specifically as an optical reader, optical pen or digital pen. The device may contain a computer system and an operating system resident thereon. Application programs may also reside thereon.

In the embodiment of FIG. 1, pen device 100 includes a processor 32 inside a housing 62. In one embodiment, housing 62 has the form of a pen or other writing or marking utensil or instrument. Processor 32 is operable for processing information and instructions used to implement the functions of pen device 100, which are described below.

In the present embodiment, the pen device 100 may include an audio output device 36 and a display device 40 coupled to the processor 32. In other embodiments, the audio output device and/or the display device are physically separated from pen device 100, but in communication with pen device 100 through either a wired or wireless connection. For wireless communication, pen device 100 can include a transceiver or transmitter (not shown in FIG. 1). The audio output device 36 may include a speaker or an audio jack (e.g., for an earphone or headphone). The display device 40 may be a liquid crystal display (LCD) or some other suitable type of display.

In the embodiment of FIG. 1, pen device 100 may include input buttons 38 coupled to the processor 32 for activating and controlling the pen device 100. For example, the input buttons 38 allow a user to input information and commands to pen device 100 or to turn pen device 100 on or off. Pen device 100 also includes a power source 34 such as a battery.

Pen device 100 also includes a light source or optical emitter 44 and a light sensor or optical detector 42 coupled to the processor 32. The optical emitter 44 may be a light emitting diode (LED), for example, and the optical detector 42 may be a charge coupled device (CCD) or complementary metal-oxide semiconductor (CMOS) imager array, for example. The optical emitter 44 illuminates surface 70 or a portion thereof. Light reflected from the surface 70 is received at and recorded by optical detector 42.

The surface 70 may be a sheet a paper, although the present invention is not so limited. In one embodiment, a pattern of markings is printed on surface 70. The end of pen device 100 that holds optical emitter 44 and optical detector 42 is placed against or near surface 70. As pen device 100 is moved relative to the surface 70, the pattern of markings are read and recorded by optical emitter 44 and optical detector 42. As discussed in more detail further below, in one embodiment, the markings on surface 70 are used to determine the position of pen device 100 relative to surface (see FIGS. 3 and 4). In another embodiment, the markings on surface 70 are used to encode information (see FIGS. 5 and 6). The captured images of surface 70 can be analyzed (processed) by pen device 100 to decode the markings and recover the encoded information.

Additional descriptions regarding surface markings for encoding information and the reading/recording of such markings by electronic devices can be found in the following patents and patent applications that are assigned to Anoto and that are all herein incorporated by reference in their entirety: U.S. Pat. No. 6,502,756, U.S. application Ser. No. 10/179,966, filed on Jun. 26, 2002, WO 01/95559, WO 01/71473, WO 01/75723, WO 01/26032, WO 01/75780, WO 01/01670, WO 01/75773, WO 01/71475, WO 10 00/73983, and WO 01116691.

Pen device 100 of FIG. 1 also includes a memory unit 48 coupled to the processor 32. In one embodiment, memory unit 48 is a removable memory unit embodied as a memory cartridge or a memory card. In another embodiment, memory unit 48 includes random access (volatile) memory (RAM) and read-only (non-volatile) memory (e.g., ROM, Flash, EEPROM, etc.) for storing information and instructions for processor 32.

In the embodiment of FIG. 1, pen device 100 includes a writing element 52 situated at the same end of pen device 100 as the optical detector 42 and the optical emitter 44. Writing element 52 can be, for example, a pen, pencil, marker or the like, and may or may not be retractable. In certain applications, writing element 52 is not needed. In other applications, a user can use writing element 52 to make marks (e.g., graphical elements) on surface 70, including characters such as letters, words, numbers, mathematical symbols and the like. These marks can be scanned (imaged) and interpreted by pen device 100 according to their position on the surface 70. The position of the user-produced marks can be determined using a pattern of marks that are printed on surface 70; refer to the discussion of FIGS. 3 and 4, below. In one embodiment, the user-produced markings can be interpreted by pen device 100 using optical character recognition (OCR) techniques that recognize handwritten characters.

As mentioned above, surface 70 may be any surface suitable on which to write, such as, for example, a sheet of paper, although surfaces consisting of materials other than paper may be used. Also, surface 70 may or may not be flat. For example, surface 70 may be embodied as the surface of a globe. Furthermore, surface 70 may be smaller or larger than a conventional (e.g., 8.5×11 inch) page of paper.

Figure 2:
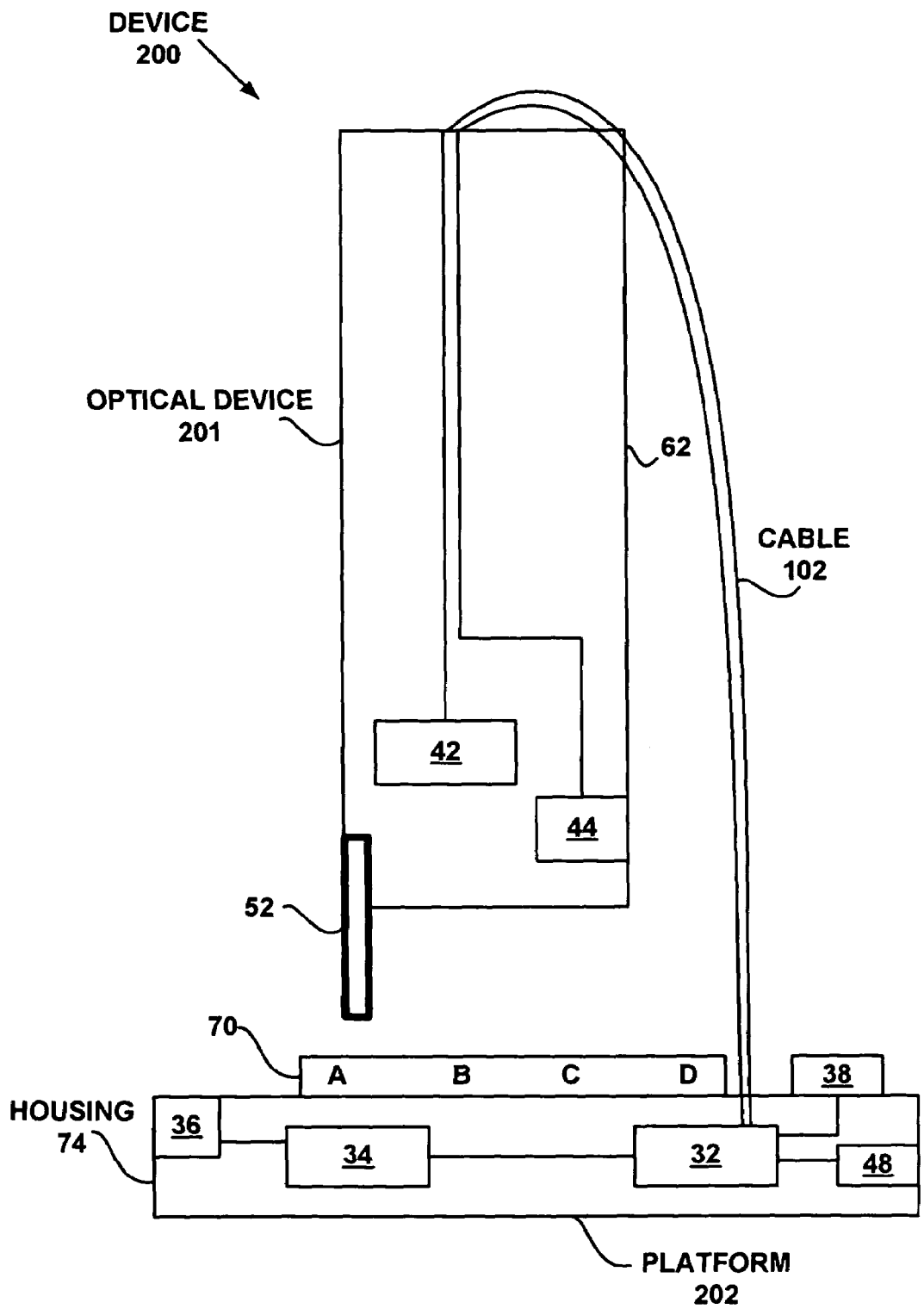
FIG. 2 is a block diagram of another device upon which embodiments of the present invention can be implemented.

FIG. 2 is a block diagram of another device 200 upon which embodiments of the present invention can be implemented. Device 200 includes processor 32, power source 34, audio output device 36, input buttons 38, memory unit 48, optical detector 42, optical emitter 44 and writing element 52, previously described herein. However, in the embodiment of FIG. 2, optical detector 42, optical emitter 44 and writing element 52 are embodied as optical device 201 in housing 62, and processor 32, power source 34, audio output device 36, input buttons 38 and memory unit 48 are embodied as platform 202 in housing 74. In the present embodiment, optical device 201 is coupled to platform 202 by a cable 102; however, a wireless connection can be used instead. The elements illustrated by FIG. 2 can be distributed between optical device 201 and platform 200 in combinations other than those described above.

Figure 3:
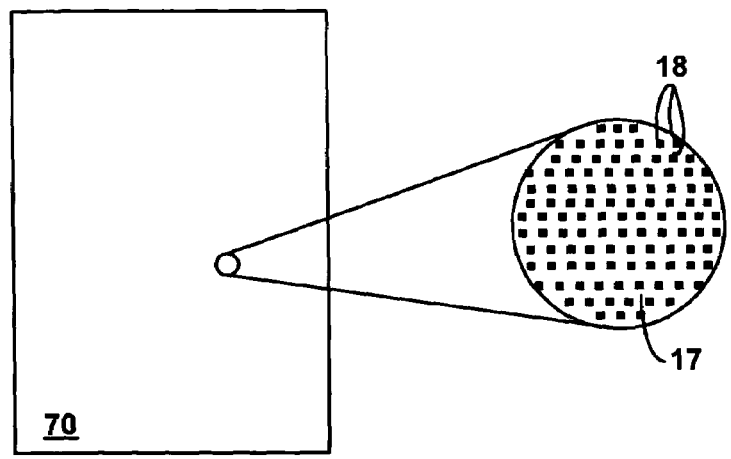
FIG. 3 shows an exemplary sheet of paper provided with a pattern of marks according to one embodiment of the present invention.

FIG. 3 shows a sheet of paper 15 provided with a pattern of marks according to one embodiment of the present invention. In the embodiment of FIG. 3, sheet of paper 15 is provided with a coding pattern in the form of optically readable position code 17 that consists of a pattern of marks 18. The marks 18 in FIG. 3 are greatly enlarged for the sake of clarity. In actuality, the marks 18 may not be easily discernible by the human visual system, and may appear as grayscale on sheet of paper 15. In one embodiment, the marks 18 are embodied as dots; however, the present invention is not so limited.

Figure 4:
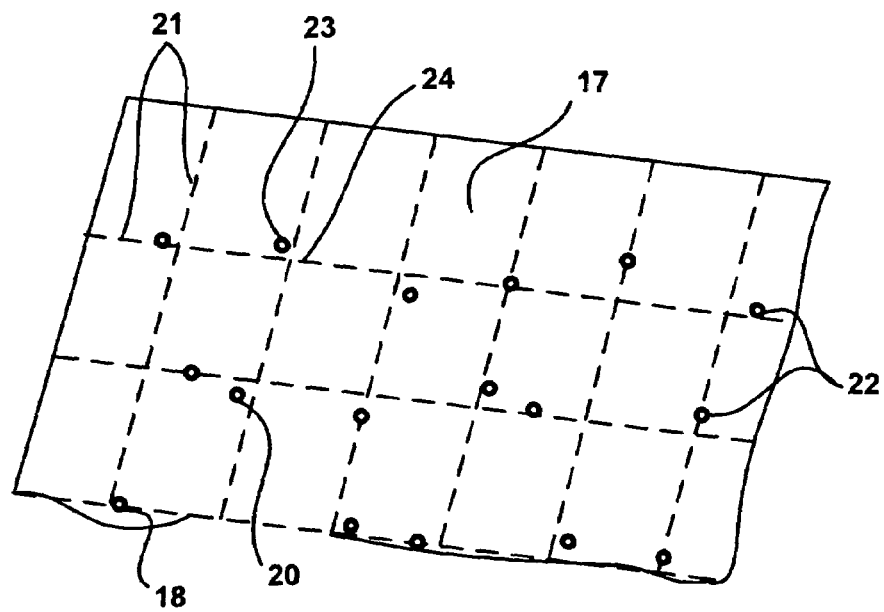
FIG. 4 shows an enlargement of a pattern of marks on an exemplary sheet of paper according to one embodiment of the present invention.

FIG. 4 shows an enlarged portion 19 of the position code 17 of FIG. 3. An optical device such as devices 100 and 200 (FIGS. 1 and 2) is positioned to record an image of a region of the position code 17. In one embodiment, the optical device fits the marks 18 to a reference system in the form of a raster with raster lines 21 that intersect at raster points 22. Each of the marks 18 is associated with a raster point 22. For example, mark 23 is associated with raster point 24. For the marks in an image/raster, the displacement of a mark from the raster point associated with the mark is determined. Using these displacements, the pattern in the image/raster is compared to patterns in the reference system. Each pattern in the reference system is associated with a particular location on the surface 70. Thus, by matching the pattern in the image/raster with a pattern in the reference system, the position of the pattern on the surface 70, and hence the position of the optical device relative to the surface 70, can be determined.

With reference back to FIG. 1, four positions or regions on surface 70 are indicated by the letters A, B, C and D (these characters are not printed on surface 70, but are used herein to indicate positions on surface 70). There may be many such regions on the surface 70. Associated with each region on surface 70 is a unique pattern of marks. The regions on surface 70 may overlap because even if some marks are shared between overlapping regions, the pattern of marks in a region is still unique to that region.

In the example of FIG. 1, using pen device 100 (specifically, using writing element 52), a user may create a character consisting, for example, of a circled letter "M" at position A on surface 70 (generally, the user may create the character at any position on surface 70). The user may create such a character in response to a prompt (e.g., an audible prompt) from pen device 100. When the user creates the character, pen device 100 records the pattern of markings that are uniquely present at the position where the character is created. The pen device 100 associates that pattern of markings with the character just created. When pen device 100 is subsequently positioned over the circled "M," pen device 100 recognizes the pattern of marks associated therewith and recognizes the position as being associated with a circled "M." In effect, pen device 100 recognizes the character using the pattern of markings at the position where the character is located, rather than by recognizing the character itself.

In one embodiment, the characters described above comprise "graphic elements" that are associated with one or more commands of the pen device 100. It should be noted that such graphic elements that are associated with, and are used to access the pen device 100 implemented functions comprising commands, are referred to as "graphic element icons" hereafter in order to distinguish from other written characters, marks, etc. that are not associated with accessing functions or applications of the pen device 100. In the example just described, a user can create (write) a graphic element icon that identifies a particular command, and can invoke that command repeatedly by simply positioning pen device 100 over the graphic element icon (e.g., the written character). In one embodiment, the writing instrument is positioned over the graphical character. In other words, the user does not have to write the character for a command each time the command is to be invoked by the pen device 100; instead, the user can write the graphic element icon for a command one time and invoke the command repeatedly using the same written graphic element icon.

In one embodiment, the graphic element icons can include a letter or number with a line circumscribing the letter or number. The line circumscribing the letter or number may be a circle, oval, square, polygon, etc. Such graphic elements appear to be like "buttons" that can be selected by the user, instead of ordinary letters and numbers. By creating a graphic element icon of this kind, the user can visually distinguish graphic element icons such as functional icons from ordinary letters and numbers, which may be treated as data by the pen device 100. Also, by creating graphic element icons of this kind, the pen device may also be able to better distinguish functional or menu item type graphic elements from non-functional or non-menu item type graphic elements. For instance, a user may create a graphic element icon that is the letter "M" which is enclosed by a circle to create an interactive "menu" graphic element icon.

The pen device 100 may be programmed to recognize an overlapping circle or square with the letter "M" in it as a functional graphic element as distinguished from the letter "M" in a word. The graphic element icon may also include a small "check mark" symbol adjacent thereto. Computer code for recognizing such functional graphic elements and distinguishing them from other non-functional graphic elements can reside in the memory unit in the pen device. The processor can recognize the graphic element icons and can identify the locations of those graphic element icons so that the pen device 100 can perform various functions, operations, and the like associated therewith. In these embodiments, the memory unit may comprise computer code for correlating any graphic elements produced by the user with their locations on the surface.

It should be noted that the generic term "graphic element" may include any suitable marking created by the user, and is distinguishable from a graphic element icon which refers to a functional graphic element that is used to access one or more functions of the device.

As mentioned above, it should be noted that graphic element icons can be created by the pen device 100 (e.g., drawn by the user) or can be pre-existing (e.g., a printed element on a sheet of paper). Example graphic elements include, but are not limited to symbols, indicia such as letters and/or numbers, characters, words, shapes, lines, etc. They can be regular or irregular in shape. User written/created graphic elements are typically created using the pen device 100.

In one embodiment of the invention, the pattern of marks 17 of FIG. 3 is very large and covers many thousands square miles before repeating if printed in entirety. In one embodiment of the invention, a portion of the pattern of marks is divided into different regions that are associated with different sizes of writing surface. For example, a portion of the pattern of marks can be associated with a 3"×5" writing surface and a different portion of the pattern of marks can be associated with an 8.5"×11" writing surface. Furthermore, the different portions of the pattern of marks can be selected in sequence, such that a plurality of pages of a notebook comprise associated patterns of marks in sequence. This allows recognition of a particular page number based on the particular pattern of dots.

Figure 5:
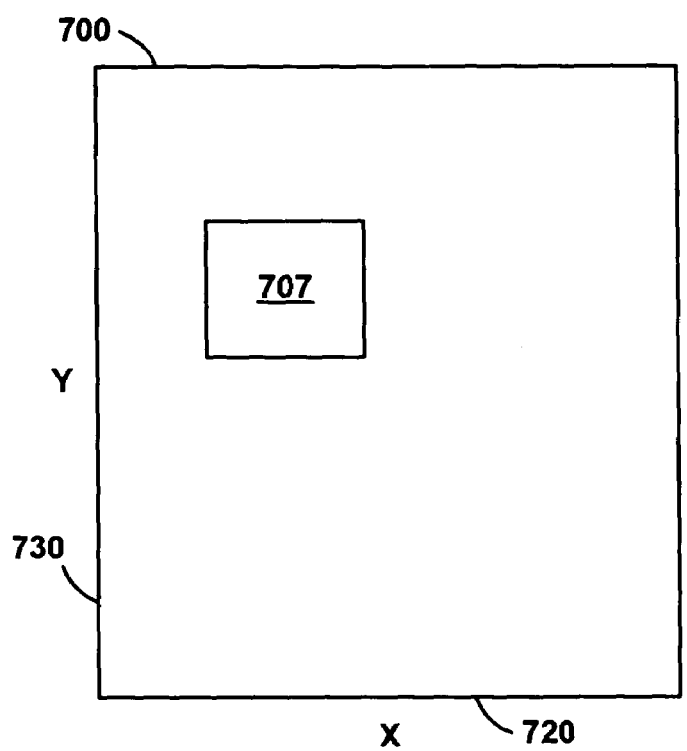
FIG. 5 is an illustration of an exemplary first portion and a sub-portion of a continuous set of encoded information in accordance with embodiments of the present invention.

FIG. 5 shows a first portion and a sub-portion of a continuous set of encoded information in accordance with embodiments of the present invention. In one embodiment of the invention, the first portion 700 of the continuous set of encoded information comprises a pattern of markings as described in conjunction with FIG. 3 and FIG. 4. In this embodiment of the invention, the pattern of markings does not repeat and is unique for a particular location. Any location within the first portion 700 of the continuous set of encoded information can be defined by an X coordinate 720 and a Y coordinate 730. Each X, Y coordinate pair corresponds to a unique pattern of markings that is recognized by the pen device. In one embodiment of the invention, region 700 is defined as "open paper."

"Open paper" is a region of the continuous set of encoded information that can be used for particular applications that do not require a pre-printed user interface on the surface. For example, the "doodles" application is an open paper application that does not require a pre-printed user interface (e.g., pre-printed art that facilitates use of the application) on the surface. The "doodles" application allows a user to write whatever they want on the encoded surface, in a diary or notebook, for example.

In one embodiment of the invention, a sub portion 707 of the first portion 700 is reserved. In one embodiment of the invention, the sub portion 707 is divided into regions that correspond to different sizes of writing surface. In one embodiment of the invention, region 707 is defined as "paged open paper," (POP). This means that the region 707 may be divided into pages, of a notebook, for example. In one embodiment of the invention, the region 707 is divided into a plurality of different page sizes. In one embodiment of the invention, POP is used for applications that do not require pre-printed art to facilitate use of the application.

Figure 6A:
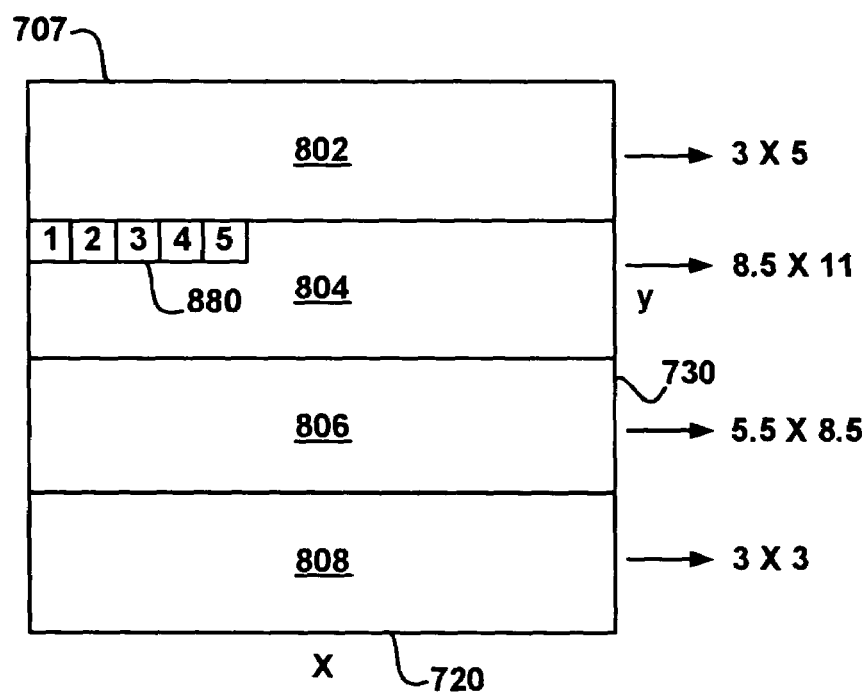
FIG. 6A is an illustration of an exemplary sub-portion of a continuous set of encoded information that is divided according to page size in accordance with embodiments of the present invention.

FIG. 6A is an illustration of an exemplary portion 707 of encoded information that is divided into regions according to a size associated with a writing surface in accordance with one embodiment of the present invention. In this embodiment, sub portion 707 includes a region 802 associated with a 3"×5" paper size, a region 804 associated with a 8.5"×11" paper size, a portion 806 associated with a 5.5"×8.5" paper size, and a portion 808 associated with a 3"×3" paper size. Each of these regions may be further divided into a plurality of "pages." For example, region 804, corresponding to a paper size of 8.5"×11," includes pages 880. Each of the pages 880 are 8.5"×11" in size and comprise different markings (encoded information).

In one embodiment of the invention, the pages 880 are used in a notebook and are numbered (e.g., 1, 2, 3, 4, 5, etc.). In this embodiment of the invention, the pages are organized consecutively with respect to the encoded information. As stated above, in one embodiment of the invention, the encoded information is printed markings as described above in conjunction with FIG. 3 and FIG. 4. For example, region 804 is divided into pages 880. Page one, starts at the upper left corner of region 804, page two is adjacent to page one and in the same row, page three is adjacent to page two and so on. In one embodiment of the invention, the pages 880 are part of a notebook. In one embodiment of the invention, the pages of the notebook are arranged according to the encoded information on the surface of the pages. In this embodiment of the invention, the pages are arranged such that the pages comprise a continuous sub portion of a larger pattern of markings.

In one embodiment of the invention, the location of the individual pages 880 can be defined by an x coordinate 720 and a y coordinate 730 (or a set of X, Y coordinate pairs). In the case of pages 880, they share the same y coordinates because they are all in the same row. In one embodiment of the invention, information corresponding to a particular page is retrieved based on the pattern on markings (encoded information) on the page. The pen device processes the markings of the page and the location information (e.g., the X, Y coordinates) is determined. In one embodiment of the invention, a look-up table stores region parameters associated with particular X, Y coordinates.

Figure 6B:
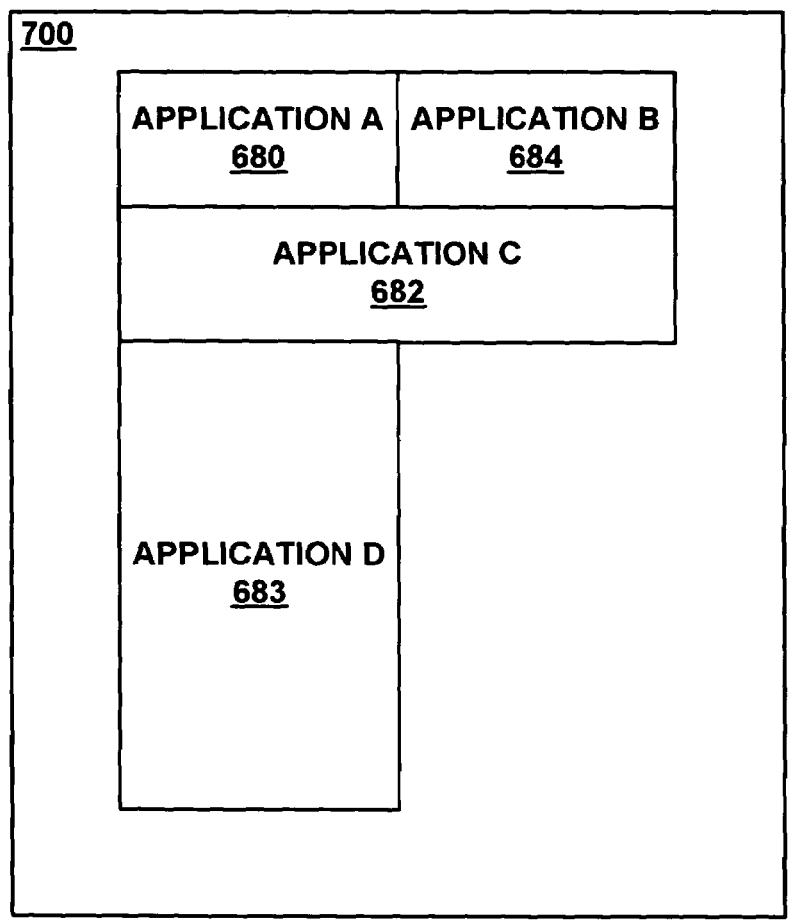
FIG. 6B is an illustration of an exemplary sub-portion of a continuous set of encoded information that is divided according to application in accordance with embodiments of the present invention.

FIG. 6B is an illustration of an exemplary sub-portion of a continuous set of encoded information 700 that is divided according to application in accordance with embodiments of the present invention. In one embodiment of the invention, a particular region of a continuous set of encoded information 700 can be divided for use with specific applications that are operable from the pen device 100 of FIG. 1. For example, the encoded area 680 is assigned to application A, encoded area 684 is assigned to application B, region 682 is assigned to application C and region 683 is assigned to application D. In one embodiment of the invention, in response to touching the pen device down inside a particular region, the associated application is launched. For example, if the pen device 100 of FIG. 1 touches down in region 683, application D would automatically launch. In another embodiment of the invention, the use of a particular region of encoded information is limited to a particular application. For example, if the pen device 100 touches down in region 680, only application A would be operable. A user attempting to use application B in region 680 might receive a response from the pen device such as "wrong page!" In one embodiment of the invention, each region (e.g., regions 680, 682, 683, 684) corresponds to a page or a plurality of pages in a notebook, for example.

Figure 6C:
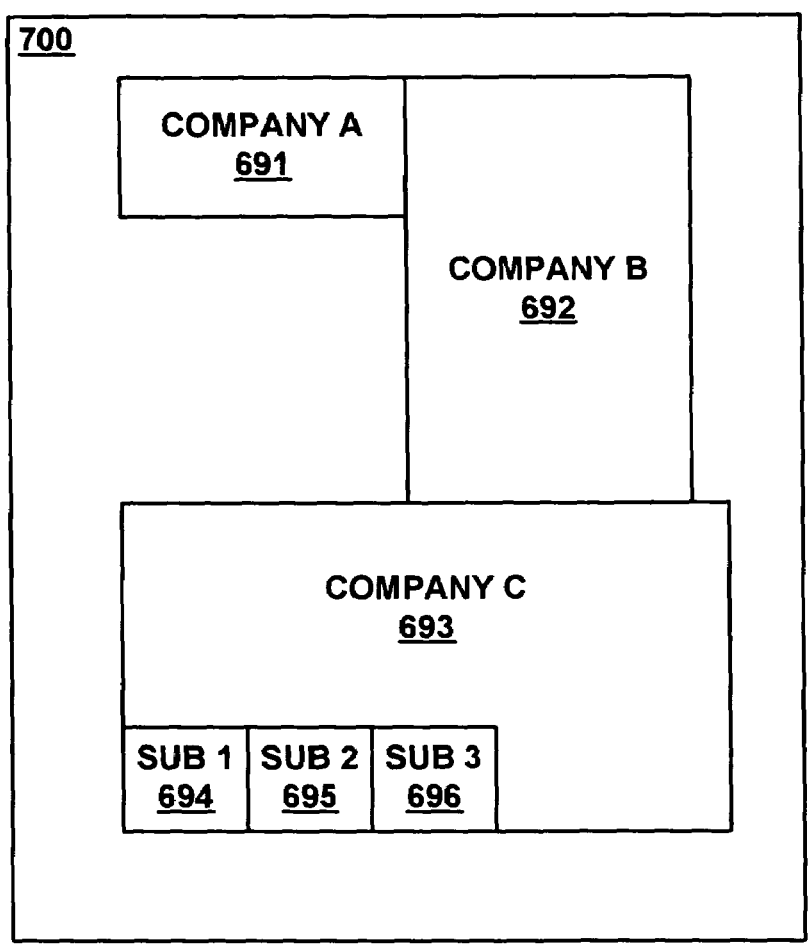
FIG. 6C is an illustration of an exemplary sub-portion of a continuous set of encoded information that is divided according to company in accordance with embodiments of the present invention.

FIG. 6C is an illustration of an exemplary sub-portion of a continuous set of encoded information 700 that is divided according to company in accordance with embodiments of the present invention. It is appreciated that "company" could be any group or organization. The term "company" is used for illustrative purposes only. In one embodiment of the invention, a particular region of a continuous set of encoded information 700 can be divided for use with specific companies that might use the pen device 100 of FIG. 1. For example, the encoded area 691 is assigned to company A, encoded area 692 is assigned to company B, region 693 is assigned to application C and within region 693 are sub regions 694, 695 and 696 assigned to subdivisions of company C, for example. In one embodiment of the invention, the use of a particular region of encoded information is limited to a particular company. For example, if the pen device 100, from FIG. 1, is touched down in region 691, only an authorized pen device associated with company A would be operable in that region. A user associated with company B attempting to use region 691 might receive a response from the pen device such as "You are not authorized to use this page!"

FIG. 7 is an illustration of an exemplary data set 900 of encoded regions and associated information in accordance with one embodiment of the present invention. In one embodiment of the invention, data set 900 may be resident in a computer memory and may be a look-up table. In one embodiment of the invention, the contents of data set 900 are stored on a memory associated with the pen device 100 of FIG. 1. In one embodiment of the invention, the contents of the data set 900 are updatable. Details of how the contents of the data set can be updated are described in conjunction with FIG. 10. Data set 900 stores region parameters for recognized regions of the defined writing surface.

Lookup table 900 stores region parameter data for many regions that are recognized by the pen computer. Each row of the table 900 is an entry and corresponds to a particular region that is defined by the (x, y) spatial definition parameter 930. The parameter 930 can be used to identify the region at which a pen computer is operating. Once the region is identified, a region identification or ID number can be obtained from parameter 910. Also, in one embodiment of the invention, the paper size associated with the region can also be obtained from parameter 720. Also, if the region is associated with a particular application, or set of applications, that parameter data can be found from parameter 795. If the region has certain authorization information, then parameter 998 contains that information. If the region is a page, then the page number may be obtained from parameter 990. In operation, upon pen down, location information is provided to the lookup table 900, which then returns the available region parameters, (for the region in which the pen down occurs) which can be used by the operating system, and/or by resident applications, to perform actions based on the region parameters.

In another embodiment of the invention, wherein the page number is not stored in the look-up table, in response to an inquiry from an application to the look-up table, the X, Y coordinates of the upper left corner of the region that the queried point falls in are returned. From the coordinates of the upper left corner of the region, in conjunction with the page size information, the current page number, notebook number, and location can be determined. For example, if the X coordinate of the queried location is 13 inches to the right of the origin (e.g., top left corner) and the page size is 3"×3", then the application can calculate that the queried point is on page 4 of the notebook and is one inch from the left border (because 13/3=4 with a remainder of 1). This means that much less information is needed in the look-up table because the page number, notebook number and location on the page can be determined mathematically by the application that performs the query.

Data set 900 includes a plurality of information associated with a plurality of spatial definitions (e.g., X, Y coordinates) 930 associated with regions of the encoded information that is divided into regions according to a variety of metrics (e.g., paper size, application, company, etc.). In one embodiment of the invention, the spatial definition 930 defines the region for which the entry corresponds and may correspond to a single page. In another embodiment of the invention, the spatial definition 930 corresponds to a plurality of pages, of a notebook for example. As stated above, the spatial definition 930 can be used to determine, for example, that a queried region is "at the top of page 47 in yellow notebook number 5." In one embodiment of the invention, the X, Y coordinates relate to the physical location of a page with relation to the entire set of encoded information (e.g., set 700 of FIG. 7). In one embodiment of the invention, the information associated with a particular page(s) can include a region ID 910.

For example, referring back to FIG. 6A, pages 880 would all have the same region ID 910 because they all are from region 804. In one embodiment of the invention, the region ID can be used to determine if a particular page is part of a notebook. In one embodiment of the invention, the region ID identifies an entire region, for example, region 804. In this case, the region ID specifies whether an area in question lies within the particular region (e.g., region 804). For example, pages with the same region ID and in the same row of a particular region could be considered part of a notebook comprising a plurality of pages.

In one embodiment of the invention, notebooks are arranges such that they come from a single row of an encoded area. Region 880 shows a five-page notebook. If the notebook had more pages, they would all be taken from that same row, extending on to the right of the pages shown. Thus, any page in the notebook 880 would have the same Y coordinate values. The next notebook to be created from this region would use the encoded region directly below the pages of notebook 880. In one embodiment of the invention, by calculating the difference between the y coordinate of a given region and the y coordinate of the origin (e.g., upper left corner) of the region from which it was taken, and given the height of pages in that region, the number of rows down in the section that the region lies can be calculated. In one embodiment of the invention, the number of rows equals the number of the notebook.

In one embodiment of the invention, the X, Y coordinates of a location on a page are used to determine a page number corresponding to that page a notebook. In another embodiment of the invention, a page number 990 for a particular spatial definition 930 is includes in the look-up table 900.

In one embodiment of the invention, the region attributes included in the look-up table can include a paper size 920 related to the region. In one embodiment of the invention, a particular application operable by pen device 100 of FIG. 1 requires a minimum writing surface size. The pen device determines if the writing surface size 920 meets the minimum requirements of the application by processing the information encoded on the writing surface.

In one embodiment of the invention, the encoded information is a pattern of markings printed on a writing surface. Upon touching down on the writing surface, the pen device processes the pattern of markings at that location to determine an X, Y coordinate for that location. Region attributes relating to the range of X, Y coordinates that includes the location touched are then retrieved, form look-up table 900 for example. In one embodiment of the invention, the size 920 of the writing surface is retrieved. If the size of the writing surface does not meet the minimum requirements of a particular application, the user is not be allowed to use that application on that particular size. In one embodiment of the invention, the pen device responds with an audio message such as "please use a larger size page for this game."

Region attributes of look-up table 900 can be used to limit use of particular applications or functions to writing surfaces with particular region IDs. For example, application information 995 may be used to limit use of a particular region to one or more applications. For example, region 680 from FIG. 6B has an application attribute 995 of "A," which specifies that only application "A" can be used within region 680.

In one embodiment of the invention, region attributes of look-up table 900 can be used to limit use of particular writing surfaces to particular companies. For example, region 691 from FIG. 6C has an authorization attribute 998 of "Company A," which specifies that only company A can use region 691.

In one embodiment of the invention, a user created graphical icon 999 is associated with location information. For example, in the case of a doodles application, a user may write down "homework". In one embodiment of the invention, the location (e.g., X1, Y1) of the word "homework" is stored and is associated with a particular region (e.g., region 802). The location information is determined from the encoded information at the location the word "homework" is written.

The location information can be used subsequently to retrieve information associated with "homework." A user could perform search for the word "homework" and the exact location (e.g., notebook number, page number, where on the page, etc.) of where "homework" was written can be determined by the X, Y coordinates stored in association with the user created icon "homework."

In one embodiment of the invention, when a user searches for the word "homework," the X, Y location of the previous uses of the word "homework" are found. Then a search is done of the look-up table to determine which spatial definition 930 contains the X, Y coordinate(s). Once it is found, (for example, in region ID 680) further calculations are performed to determine where in region 680 the X, Y location exists. This calculation uses the origin of the region 680, which in this case is given by X3, Y3 to determine the distance from the origin to the X, Y point in question. This distance is then divided by the paper size 920, which in this case is 8.5"×11". This will yield a row and column number. The row number corresponds to the notebook number and the column number corresponds to the page number of that notebook. Further calculations can be performed to show where on the page, specifically, that point X, Y exists.

Figure 8A:
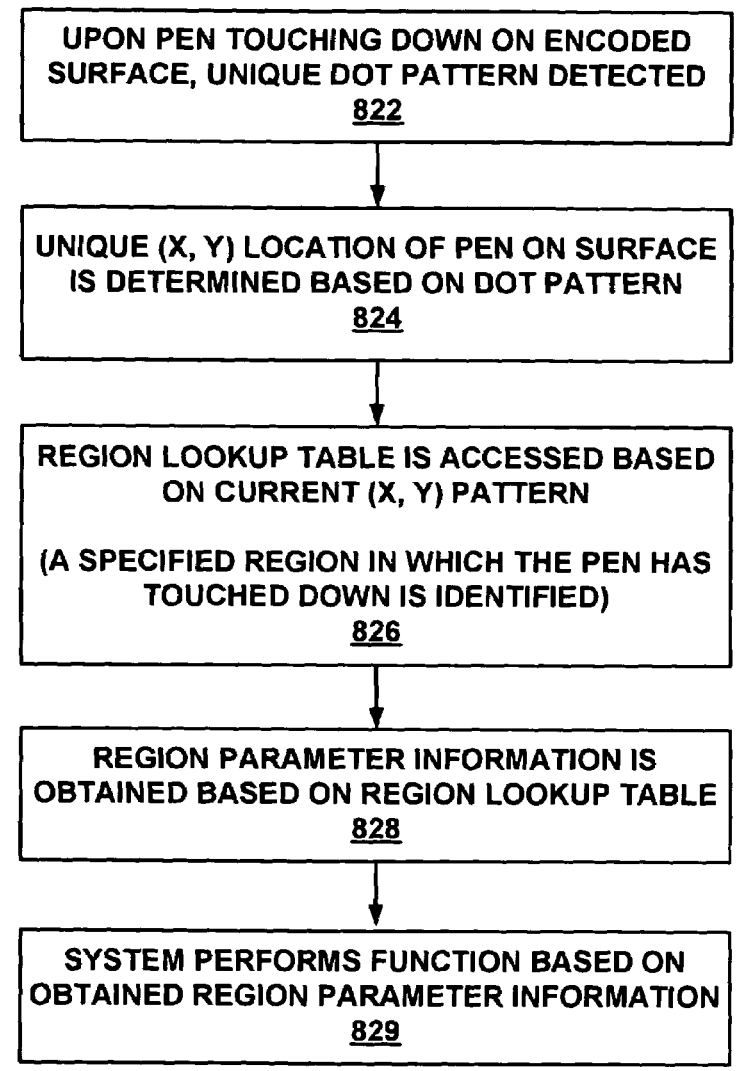
FIG. 8A is a flow chart of an exemplary computer implemented method for interfacing with an encoded surface in accordance with embodiments of the present invention.

FIG. 8A is a flow chart of an exemplary computer implemented method 800 for interfacing with an encoded surface in accordance with embodiments of the present invention. At step 822, method 800 includes upon touching down on an encoded surface, detecting a unique dot pattern. In one embodiment of the invention, the dot pattern is used to obtain location information of an encoded map. In another embodiment of the invention, the location information is retrieved from somewhere it was previously stored. In the first example above, (the "this page isn't big enough to play this game" example), the location was found on a pen down-touch as described in step 822. However, in the example of locating the word "homework," the location information was stored in memory along with the word "homework" and was not based on a current pen down-touch but rather one from a previous session.

At step 824, method 800 includes determining a unique X, Y location of a pen device on the surface based on the dot pattern. In one embodiment of the invention, a particular X, Y location is associated with a unique dot pattern At step 826, method 800 includes accessing a region parameter from a look-up table based on the retrieved X, Y coordinates to identify a region and in one embodiment of the invention, a region identifier associated with the particular X, Y coordinate is retrieved. In one embodiment of the invention, step 826 is performed by the application that is currently running. For example, some applications may not care about the location of the encoded region in use. Other applications, for example, those that want to check on the paper size in use, are the ones that do care and they would send the look-up request to the look-up table.

At step 828, method 800 includes obtaining one or more region parameters from the look-up table that corresponds to the X, Y coordinate. In one embodiment of the invention, the region parameter includes page attributes associated with the location at which the pen device touched town. Other region parameters are shown in FIG. 7.

At step 829, method 800 includes performing a computer function based on the obtained region parameter.

Figure 8B:
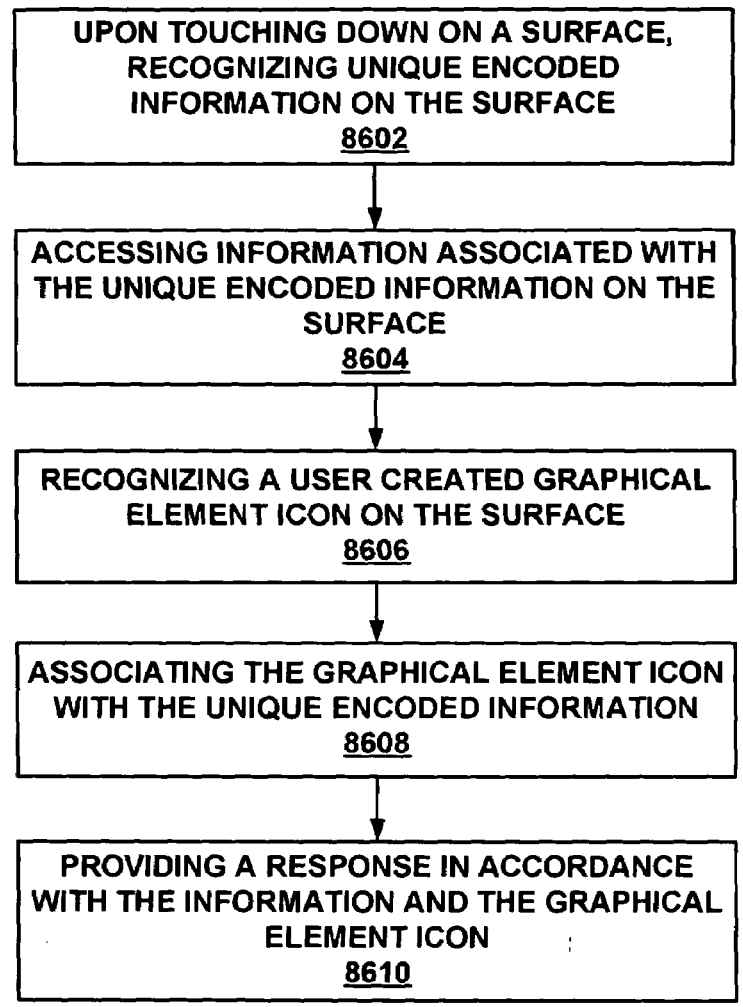
FIG. 8B is a flow chart of an exemplary computer implemented method for interfacing with an encoded surface including recognizing a user created graphical element icon in accordance with embodiments of the present invention.

FIG. 8B is a flow chart of an exemplary computer implemented method 8600 for interfacing with an encoded surface including recognizing a user created graphical element icon in accordance with embodiments of the present invention.

At step 8602, method 8600 includes upon touching down on a surface, recognizing unique encoded information on the surface. As described above in conjunction with FIG. 1, the captured images of surface can be analyzed (processed) by pen device 100 (of FIG. 1) to decode the markings (encoded information). In one embodiment of the invention, the encoded information comprises markings (e.g., dots) printed on the surface of the paper, as described in conjunction with FIG. 3 and FIG. 4 above.

At step 8604, method 8600 includes accessing information associated with the unique encoded information on the surface. In one embodiment of the invention, the pen device processes the encoded information and location information is recognized. In addition to dimensional information, the associated information can include application specific rules or application independent functions such as a volume control function.

At step 8606, method 8600 includes recognizing a user created graphical element icon on the surface. In one embodiment of the invention, optical character recognition (OCR) is used to recognize the user created graphical element icon, although it is appreciated that many techniques can be used to perform the recognition.

Once the user created graphical element icon is recognized, step 8608 includes associating the user created graphical element icon is associated with the unique encoded information on the surface at the location, of the user created icon. In one embodiment of the invention, a data set such as a look-up table is used to store the user created icons and the associated X, Y coordinates of the location of the icons.

At step 8610, method 8600 includes providing a response in accordance with the information accessed in step 8604 and in accordance with the graphical element icon. In one embodiment of the invention, the response can include automatically launching an application associated with the user created graphical icon. In another embodiment of the invention, the response can include user instructions such as "you can't play this game on this size paper."

Additional descriptions of methods for accessing region parameter information associated with coded information on a surface can be found in the co-pending, commonly-owned U.S. patent application "A Method And System For Accessing Region Parameter Information Associated With Encoded Information On A Surface," Ser. No. 11/244,652, filed Oct. 05, 2005, by Tracy L. Edgecomb et al., which is incorporated herein in its entirety.

Figure 9:
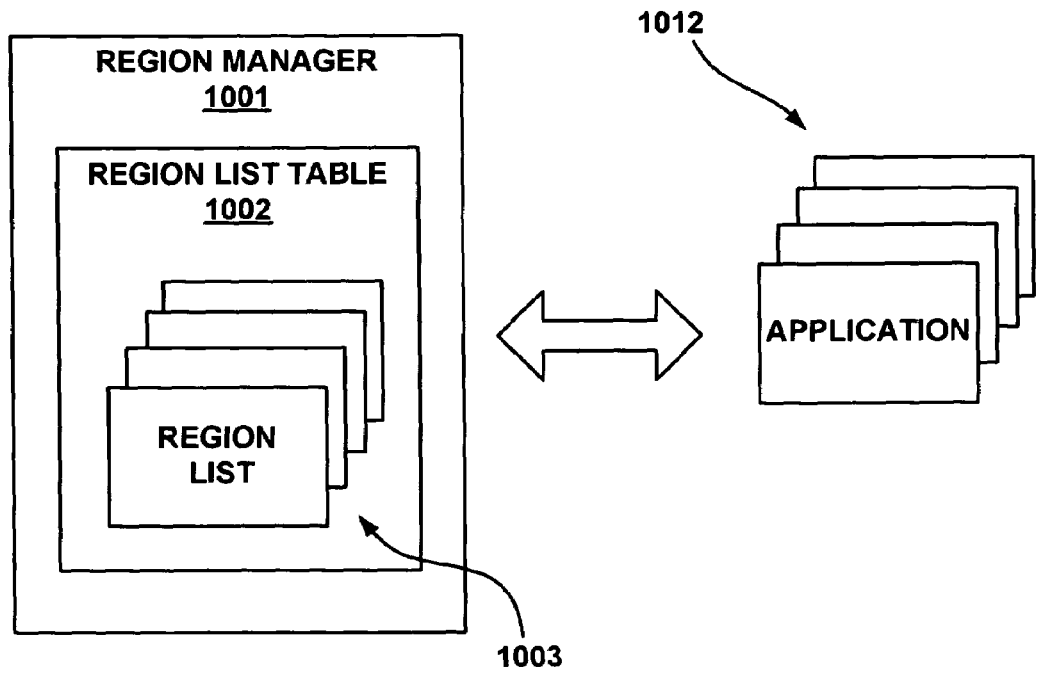
FIG. 9 shows a diagram illustrating a region manager in accordance with one embodiment of the present invention.

Embodiments for Hierarchical Management of a
Plurality of Regions of an Encoded Surface Used
by a Pen Computer With reference now to FIG. 9, a diagram 1000 illustrating a region manager 1001 in accordance with one embodiment of the present invention is shown. As depicted in diagram 1000, the region manager 1001 includes a region list table 1002 storing a plurality of region lists 1003. Diagram 1000 also depicts a plurality of applications 1012 that operate in conjunction with the region lists 1003.

Embodiments of the present invention implement a hierarchical management method for a plurality of regions of an encoded surface. The method includes recognizing unique encoded information on a portion of the surface in response to a pen computer touching down on the portion. As described above, a unique location of the portion of the surface can be determined based on the unique encoded information (e.g., dot patterns). A region is determined out of the plurality of regions for the location. For example, as described above, region parameter data for many regions can be accessed and recognized by the pen computer. This parameter data corresponding to the particular regions can be stored within the region list table 1002. For example, as described above, the region list table 1002 can function as a table data structure having a plurality of entries that each corresponds to a particular region that is defined by a (x, y) spatial definition parameter (e.g., parameter 930). This location (e.g., parameter 930) can be used to identify the region the pen computer is using.

Upon the determination of the region, a determination can be made as to whether the location is within a sub-region within the region. If the location is within a sub-region, a function of the pen computer is performed based on the sub-region. If the location is not within a sub-region, a function of the pen computer is performed based on the region. Regions are thus hierarchical in nature, and are managed by the region manager 1001 in a hierarchical manner. Once a high-level region is identified, the high-level region can be traversed in order to determine whether a particular location is within a lower-level region.

The determination of the particular region that a particular location is within is used to invoke an application corresponding to that region. For example, as described above in the discussion of FIG. 6B, each of the applications 1012 can be associated with a corresponding region of the encoded surface. A down touch of the pen device inside a region associated with one of the applications 1012 can be used to automatically invoke the functionality of the application (e.g., launch the application, etc.).

In one embodiment, the relationship between the plurality of regions 1003 and the plurality of applications 1012 is defined by the respective region lists 1003 stored within the region list table 1002. For example, each of the applications 1012 can be associated with a respective region list 1003 stored in the region list table 1002. The region manager 1001 receives location information from a down touch of the pen device and traverses the region lists within the region list table 1002 to identify which particular region corresponds to the location. The corresponding region list is then used to invoke the functionality of the corresponding application. In this manner, the region list table 1002 functions in a manner substantially similar to the lookup table 900 described above. In one embodiment, the region list table 1002 and the lookup table 900 comprise a common data structure.

The hierarchical arrangement of regions within a continuous set of encoded information greatly increases the efficiency of the process of allocating different regions of the encoded information to different applications. As described above, the region manager 1001 receives location information from a down touch of the pen device and traverses the region list table 1002 to identify which particular region corresponds to the location. The hierarchical arrangement of the regions makes traversal of the encoded information much less expensive in terms of computer system resources. For example, by partitioning the large continuous set of encoded information into a plurality of comparatively large high-level regions, the total volume of encoded information which must be searched by the pen computer can be reduced by an order of magnitude or more.

For example, once a first location is determined to be within a first high-level region (e.g., a notebook application region), subsequent traversals of the region list table 1002 need only be performed on the encoded information comprising that particular region. For example, once a down touch of the pen device is determined to be for encoded information corresponding to a notebook application, subsequent down touches can be quickly located by focusing the traversal engine of the region manager 1001 to the notebook application region, and in particular, the various notebook application sub-regions. This can allow the pen device to rapidly identify locations corresponding to particular pages (e.g., sub-regions) of a given note book, and in the process greatly reduce the resource demands on the computer system of the pen device. A user would thus perceive a higher degree of responsiveness from the pen device.

Figure 10:
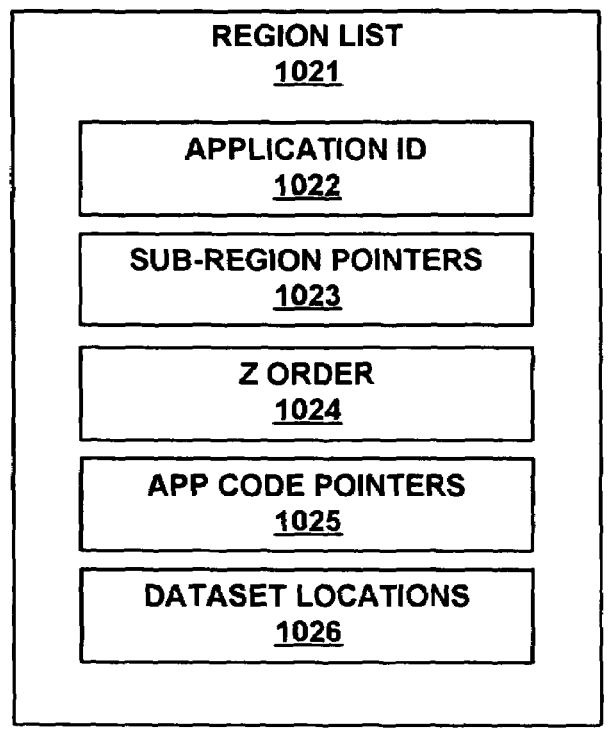
FIG. 10 shows a diagram depicting the data structure of a region list in accordance with one embodiment of the present invention.

FIG. 10 shows a diagram 1020 depicting the data structure of a region list 1021 in accordance with one embodiment of the present invention. As depicted in diagram 1020, the region list 1021 includes a plurality of parameters 1022–1026 that describe the attributes of the region 1021.

In the region list 1021 embodiment, the parameters application ID 1022, sub-region pointers 1023, a Z order 1024, application code pointers 1025, and data set locations 1026 are shown. As described above, the application ID parameter 1022 is used to identify which particular region defined by the region list corresponds to which particular application. The region manager 1001 uses this parameter to determine which application to invoke upon a location determination, and also uses this parameter to accelerate the location determination process in the manner described above.

The sub-region pointers parameter 1023 comprises pointers to sub-regions within the region. The region manager 1001 uses this parameter to track the hierarchy of regions and their constituent sub-regions. The Z order parameter 1024 functions as an "overlay" order parameter. This parameter can be used to resolve cases where two or more different regions overlap one another. For example, the overlay order parameter can be used to determine that one region is beneath a nearby overlapping region. The overlapping region is referred to as being on top of the underlying region, and is generally given priority in the allocation of execution time. Where two regions overlap, the region on top (e.g., a drawn on or printed on a sheet of paper) is generally considered the currently active region.

The application code pointers parameter 1025 comprises a pointer to memory addresses of software code comprising the application. The region manager 1001 uses this parameter to invoke (e.g., software routine call) the software-based functionality of the application. The data set locations parameter 1026 comprises pointers to memory addresses of data sets used by the application.

In this manner, the region list 1021 comprises an efficient data structure describing a region of the encoded information that is associated with a particular application. This region can itself define other constituent sub-regions. The sub-regions themselves can have further sub-regions, and so on, in accordance with the hierarchical attributes of the region manager 1001.

Figure 11:
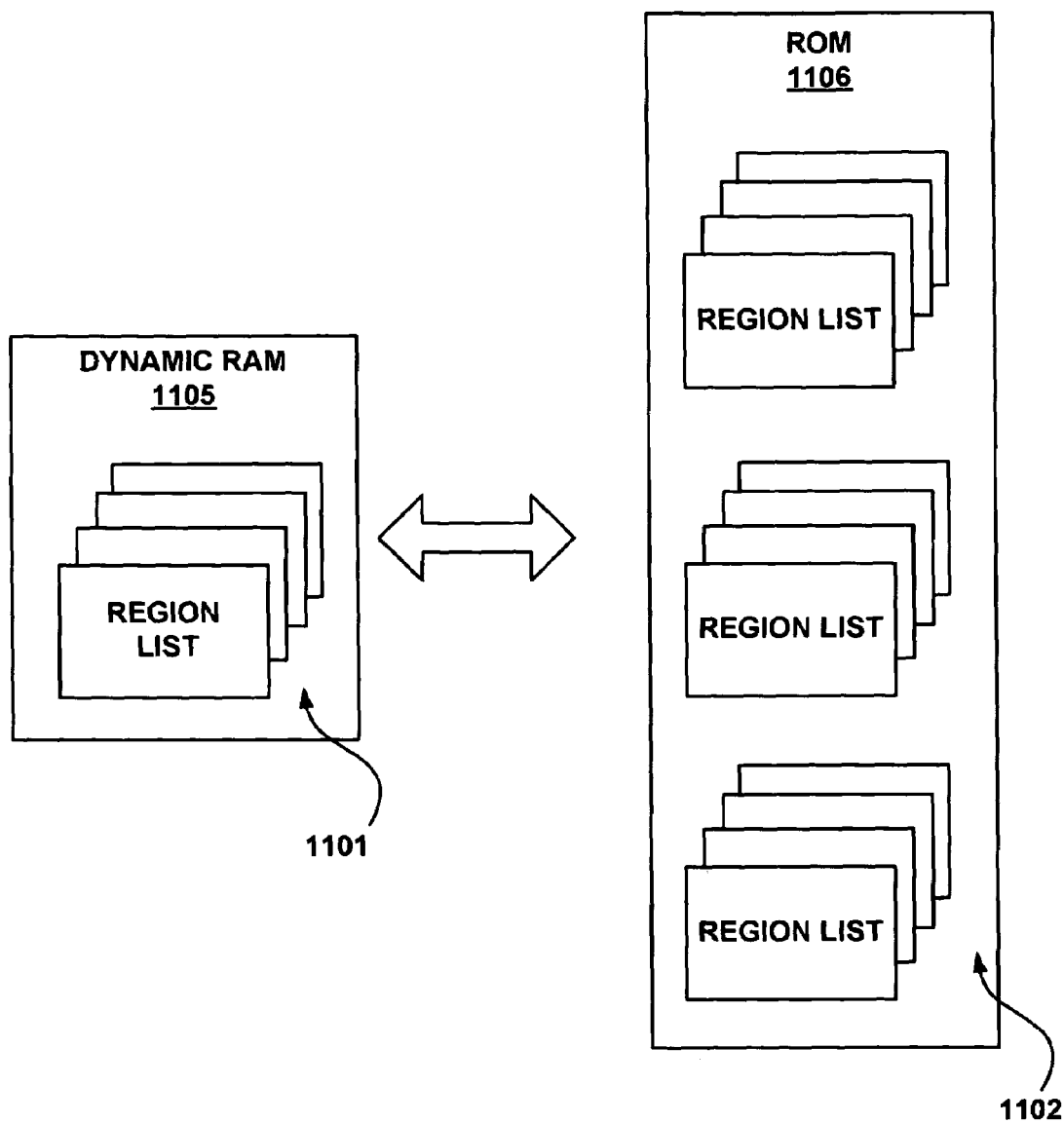
FIG. 11 shows a diagram depicting a set of region lists stored in dynamic RAM and a set a region lists stored within ROM in accordance with one embodiment of the present invention.

FIG. 11 shows a diagram 1100 depicting a set of region lists 1101 stored in dynamic RAM 1105 and a set a region lists 1102 stored within ROM 1106, in accordance with one embodiment of the present invention. In the present embodiment, Flash memory comprises the ROM 1106. As depicted in FIG. 11, the RAM 1105 and the ROM 1106 comprise the computer readable memory (e.g., memory unit 48) of the pen device 100.

Diagram 1100 illustrates the performance optimization process performed by the region manager 1001. The dynamic RAM 1105 comprises a higher speed memory of the pen device 100 in comparison to the Flash memory of the ROM 1106, which has a slower access speed. In one embodiment, the region manager 1001 makes intelligent decisions regarding which of the region lists should be stored in high-speed memory as supposed to low speed memory. Generally, dynamic RAM is more expensive than Flash ROM. Because this, it is economical to incorporate within the pen device larger amounts of Flash ROM in comparison to RAM. The region manager 1001 of the present embodiment efficiently utilizes the high speed attributes of the RAM 1105 by ensuring the most time sensitive region lists are stored in RAM 1105. For example, inactive region lists and/or rarely used region lists can remain in Flash ROM and have no significant effect on the performance of the pen device. In contrast, current region lists and those region lists which are often used are stored within the RAM 1105. The higher access speed the RAM 1105 can significantly improve the performance of the pen device.

In one embodiment, the region manager 1001 uses the overlay order parameter (e.g., the Z order parameter 1024) to distinguish between regions that overlap other regions. Generally, the region on top is considered the current region and is given priority. The corresponding current region list is then moved by the region manager 1001 into dynamic RAM 1105 (e.g., if not already there). In another example, when a new application is invoked, that application sends its region list to the region manager 1001 for storage in the region list table 1002. The region manager 1001 can treat this newly activated application as the current application and store its region list into the dynamic RAM 1105 (e.g., as the current region). If necessary, one or more inactive region lists can be evicted from the dynamic RAM 1105 and written back to the Flash memory, or delete it entirely, to make room.

Figure 12:
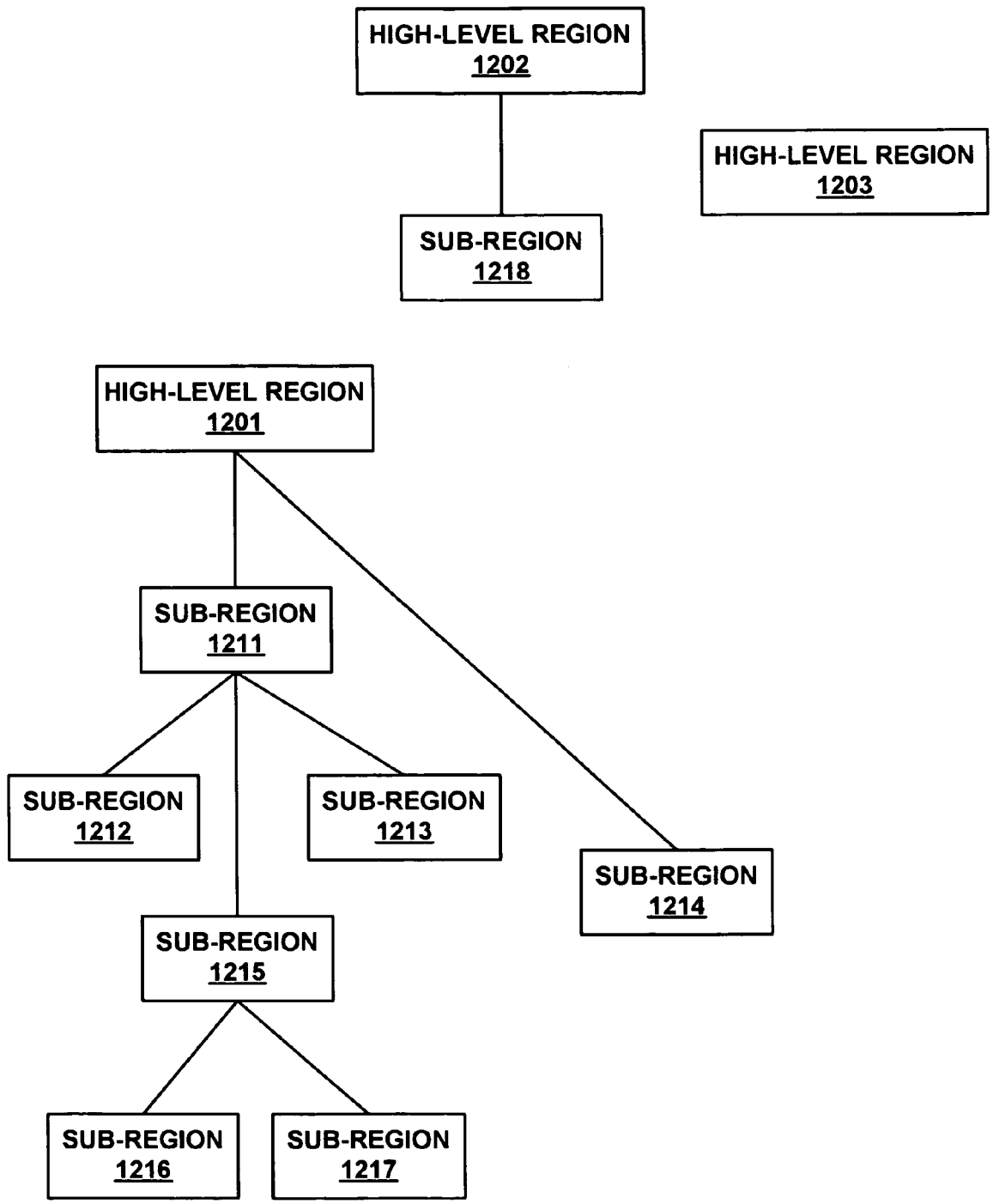
FIG. 12 shows a diagram depicting a hierarchical relationship between a plurality of regions and sub-regions in accordance with one embodiment of the present invention.

FIG. 12 shows a diagram 1200 depicting a hierarchical relationship between a plurality of regions 1201–1203 and sub-regions 1211–1218 in accordance with one embodiment of the present invention. Diagram 1200 illustrates the manner in which a high-level region 1201 can incorporate multiple sub-regions. For example, the high-level region 1201, or simply region 1201, incorporates the sub-region 1211 and 1214. Sub-region 1211 itself incorporates sub-regions 1212, 1213, and 1215, while the sub-region 1215 further incorporates sub-regions 1216 and 1217. The region 1202 incorporates a single sub-region 1218. In contrast, the region 1203 stands on its own and does not have any constituent sub-regions. In one embodiment, region lists are only associated with the high-level regions 1201–1203. The sub-regions are instantiated via sub-region pointers (e.g., sub-region pointer parameter 1023) contained within the region lists of the respective high-level regions. It should be noted that for those cases where a region has no sub-regions (e.g., region 1203), the sub-region pointer parameter 1023 of the corresponding region list can be a null value. It should further be noted that a parent region can spawn multiple sub-regions, where each sub-region will have its own respective application ID parameter, and overlay order parameter.

Figure 13:
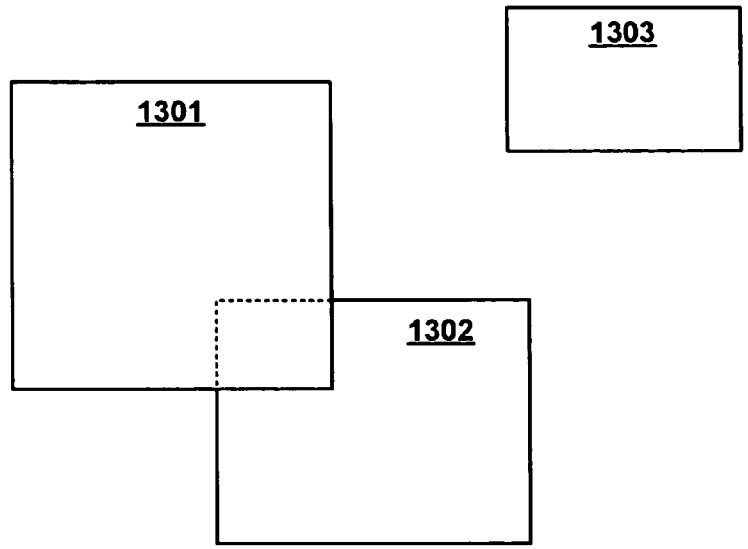
FIG. 13 shows a two-dimensional diagram depicting a plurality of regions associated with a plurality of applications as managed by the region manager in accordance with one embodiment of the present invention.
Figure 13:
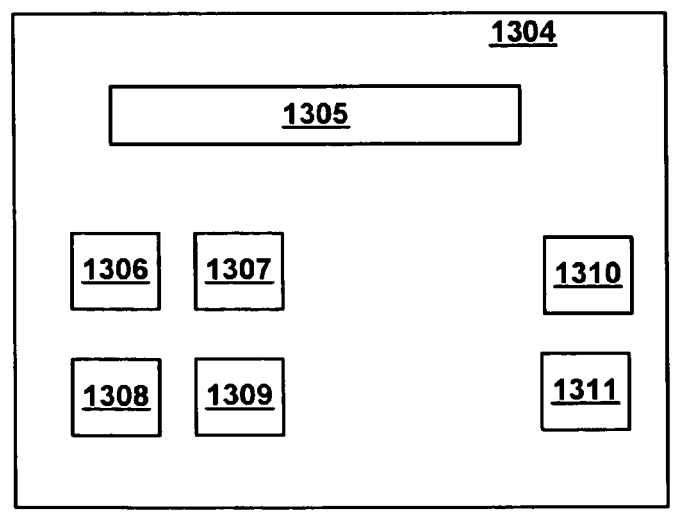

FIG. 13 shows a two-dimensional diagram 1300 depicting a plurality of regions associated with a plurality of applications as managed by the region manager 1001 in accordance with one embodiment of the present invention. Diagram 1300 illustrates regions of encoded information (e.g., printed on the surface of a sheet of paper) that correspond to applications executed by the pen device 100. For example, the region 1301 in 1302 are overlapping. The region manager 1001 can designate the region 1301 as the foreground region and the region 1302 as the background region in accordance with the respective overlay order parameters. The region 1303 can be designated as the current region even though it does that overlap the region 1301 or the region 1302. The region 1303 can be, for example, the most recently activated application. The region 1304 shows a plurality of constituent sub-regions 1305–1311. The region 1304 can thus designate top-level functionality of the sub-regions 1305–1311. Upon a down to it within one of the sub-regions 1305–1311, specialized application behavior can be invoked in accordance with the particular sub-region. This characteristic is further described in the discussion of FIG. 14 below.

FIG. 14 shows a two-dimensional diagram 1400 depicting the regions 1401 and 1402 for a translator application and the regions 1405 and 1406 for a calculator application in accordance with one embodiment of the present invention. In the case of the calculator application, the region of 1405 comprises a graphic element icon use to invoke the calculator application and is thus the high-level region of the application.

For instance, after the user invokes the "calculator" application by down touching the graphic element icon 1405, the pen device may instruct the user to draw the numbers 0–9, and the operators ±, −'×, /, and = (e.g., the user defined region 1406) and then select the numbers to perform a math calculation. In this case, the sub-regions comprise the numbers 0–9, and the operators ±, −'×, /, and =, and are themselves user defined.

In the translator example, after the user selects the "translator" graphic element icon 1401, the pen device can instruct the user to draw a box (e.g., region 1402) and write a word in a selected language (e.g., agua). After the user does this, the pen device can announce to the user the written word translated into the second language (e.g., water). In both the calculator and the translator examples, the regions comprise user defined regions, however, it should be appreciated that the applications can function with preprinted predetermined regions.

Figure 15:
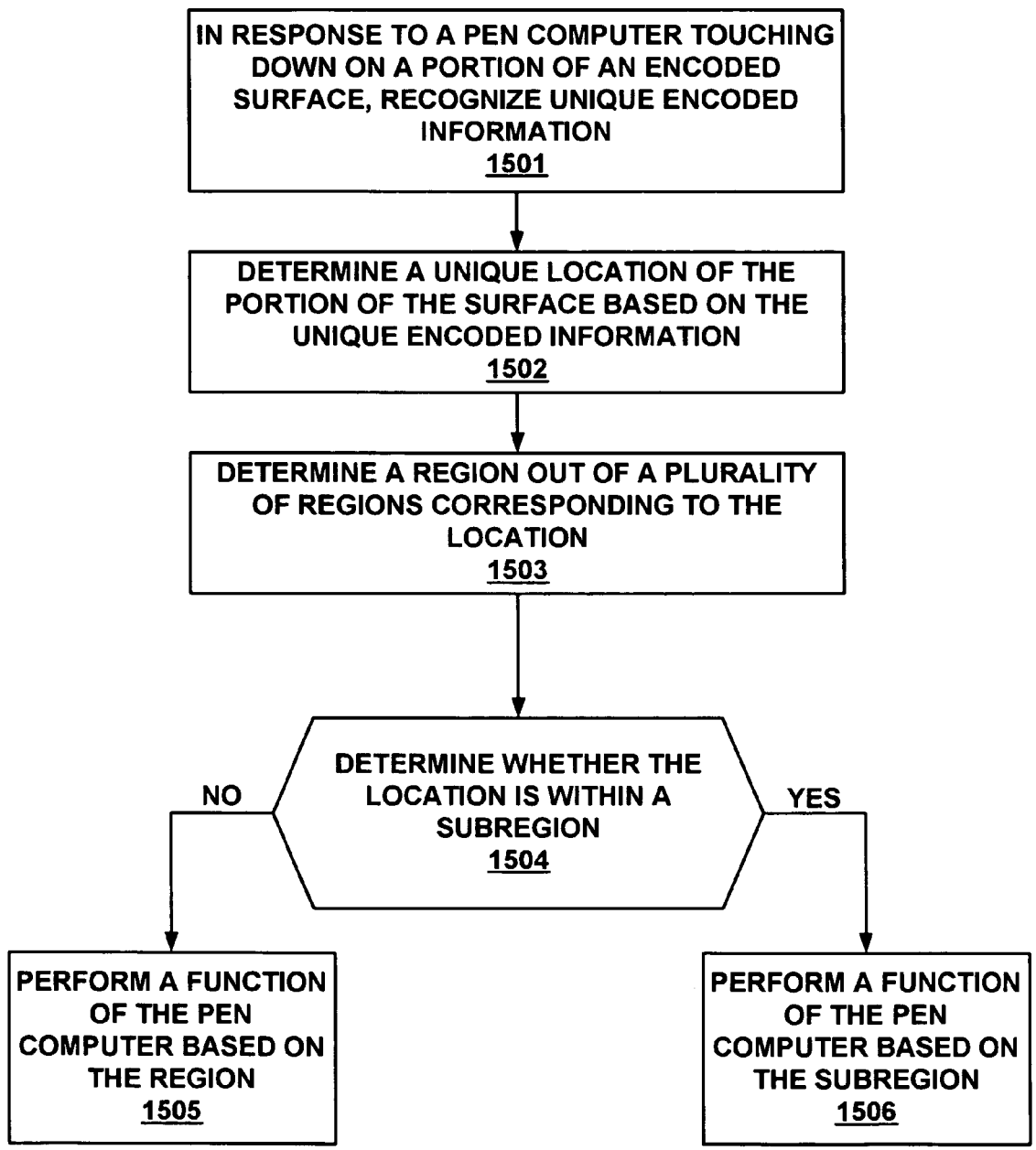
FIG. 15 shows a flowchart of the steps of a process in accordance with one embodiment of the present invention.

FIG. 15 shows a flowchart of the steps of a process 1500 in accordance with one embodiment of the present invention. As depicted in FIG. 15, process 1500 shows the operating steps involved in a hierarchical region management process as implemented by a region manager (e.g., region manager 1001) of a pen device (e.g., pen device 100) in accordance with one embodiment of the present invention.

Process 1500 begins in step 1501, where the pen computer 100 recognizes unique encoded information on a portion of an encoded surface in response to the pen computer 100 touching down on the portion. In step 1502, a unique location of the portion of the surface is determined based on the unique encoded information (e.g., the dot pattern). In step 1503, as described above, the region manager 1001 determines the region out of the plurality of regions that corresponds to the location. In step 1504, upon the determination of the region, the region manager 1001 determines whether the location is within a sub-region within the region. As described above, in step 1505, if the location is not within a sub-region, a function of the pen computer is performed based on the region (e.g., the high-level region). In step 1506, if the location is within a sub-region, a function of the pen computer 100 is performed based on the sub-region.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for hierarchical management of a plurality of regions of an encoded surface, comprising:
   in response to a pen computer touching down on a portion of the surface, recognizing unique encoded information on the portion;
   determining a unique location of the portion of the surface based on the unique encoded information;
   determining a region of the plurality of regions for the location;
   upon determination of the region, determine whether the location is within a sub-region within the region;
   if the location is within a sub-region, performing a function of the pen computer based on the sub-region; and
   if the location is not within a sub-region, performing a function of the pen computer based on the region.

2. The method of claim 1, further comprising:
   accessing a memory resident look-up table of the pen computer based on the location to determine the region associated with the portion, wherein the look-up table is configured to store a plurality of region lists associated with a plurality of regions.

3. The method of claim 2, further comprising:
   traversing the region list based on the location to determine the sub-region associated with the portion.

4. The method of claim 3, further comprising:
   traversing the sub-region based on the location to determine whether the location is within a lower sub-region associated with the portion; and
   if the location is within the lower sub-region, performing a function of the pen computer on the lower sub-region.

5. The method of claim 2, wherein each of the plurality of region lists comprises an application identifier corresponding to the application related to the region.

6. The method of claim 2, wherein each of the plurality of region lists comprises an overlay order parameter corresponding to a processing order of the region with respect to a plurality of other regions.

7. The method of claim 6, further comprising:
   traversing a plurality of overlay order parameters of the plurality of region lists to determine at least one currently active region list; and
   transferring the at least one currently active region list from lower speed memory to higher-speed memory.

8. The method of claim 7, wherein the higher speed memory comprises RAM and the lower speed memory comprises Flash memory.

9. The method of claim 2, wherein for each region having a sub-region, the respective region list comprises a sub-region pointer to the sub-region.

10. The method of claim 1, wherein the region is a predetermined static region related to a predetermined application.

11. The method of claim 1, wherein the region is a dynamic region defined at runtime of the pen computer.

12. The method of claim 11, wherein the dynamic region is user defined.

13. A pen computer system comprising:
   a writing instrument;
   an optical sensor coupled to a bus for detecting encoded information printed on a writing surface;
   a processor coupled to the bus for determining a location of a pen tip with respect to the writing surface based on the encoded information; and
   a memory coupled to the bus, the memory storing computer readable code which when executed by the processor causes the pen computer system to implement a method for hierarchical management of a plurality of regions comprising:
     determining a region of the plurality of regions for the location;
     upon determination of the region, determine whether the location is within a sub-region within the region;
     if the location is within a sub-region, performing a function of the pen computer based on the sub-region; and
     if the location is not within a sub-region, performing a function of the pen computer based on the region.

14. The pen computer system of claim 13, further comprising:
   accessing a memory resident look-up table of the pen computer based on the location to determine the region associated with the portion, wherein the look-up table is configured to store a plurality of region lists associated with a plurality of regions.

15. The pen computer system of claim 14, further comprising:
   traversing the region list based on the location to determine the sub-region associated with the portion.

16. The pen computer system of claim 15, further comprising:
   traversing the sub-region based on the location to determine whether the location is within a lower sub-region associated with the portion; and
   if the location is within the lower sub-region, performing a function of the pen computer on the lower sub-region.

17. The pen computer system of claim 14, wherein each of the plurality of region lists comprises an application identifier corresponding to the application related to the region.

18. The pen computer system of claim 14, wherein each of the plurality of region lists comprises an overlay order parameter corresponding to a processing order of the region with respect to a plurality of other regions.

19. The pen computer system of claim 18, further comprising:
   traversing a plurality of overlay order parameters of the plurality of region lists to determine at least one currently active region list; and
   transferring the at least one currently active region list from lower speed memory to higher-speed memory.

20. The pen computer system of claim 19, wherein the higher speed memory comprises RAM and the lower speed memory comprises Flash memory.

21. The pen computer system of claim 14, wherein for each region having a sub-region, the respective region list comprises a sub-region pointer to the sub-region.

22. The pen computer system of claim 13, wherein the region is a predetermined static region related to a predetermined application.

23. The pen computer system of claim 13, wherein the region is a dynamic region defined at runtime of the pen computer.

24. The pen computer system of claim 23, wherein the dynamic region is user defined.

25. A method for hierarchical management of a plurality of regions of an encoded surface, comprising:
   in response to a pen computer touching down on a portion of the surface, recognizing unique encoded information on the portion;
   determining a unique location of the portion of the surface based on the unique encoded information;
   determining a region of the plurality of regions for the location;
   upon determination of the region, determine whether the location is within a sub-region within the region;
   if the location is within a sub-region, performing a function of the pen computer based on the sub-region;
   if the location is not within a sub-region, performing a function of the pen computer based on the region; and
   accessing a memory resident look-up table of the pen computer based on the location to determine the region associated with the portion, wherein the look-up table is configured to store a plurality of region lists associated with a plurality of regions.

26. The method of claim 25, further comprising:
   traversing the region list based on the location to determine the sub-region associated with the portion.

27. The method of claim 26, further comprising:
   traversing the sub-region based on the location to determine whether the location is within a lower sub-region associated with the portion; and
   if the location is within the lower sub-region, performing a function of the pen computer on the lower sub-region.

28. The method of claim 25, wherein each of the plurality of region lists comprises an application identifier corresponding to the application related to the region, an overlay order parameter corresponding to a processing order of the region with respect to a plurality of other regions, and, for each region having a sub-region, a sub-region pointer to the sub-region.

29. The method of claim 28, further comprising:
traversing a plurality of overlay order parameters of the plurality of region lists to determine at least one currently active region list; and
transferring the at least one currently active region list from Flash memory to RAM memory.

30. The method of claim 25, wherein the region is a predetermined static region related to a predetermined application.

31. The method of claim 25, wherein the region is a user defined dynamic region created at runtime of the pen computer.

* * * * *